United States Patent [19]

Wakeman

[11] Patent Number: 4,738,371

[45] Date of Patent: Apr. 19, 1988

[54] PALLET WRAP

[76] Inventor: John A. Wakeman, 3623 NE. Sixth Ct., Gresham, Oreg. 97030

[21] Appl. No.: 926,651

[22] Filed: Nov. 4, 1986

[51] Int. Cl.$^4$ ............................................. B65D 19/00
[52] U.S. Cl. .................................. 217/43 A; 220/1.5; 220/4 F
[58] Field of Search .......................... 217/43 R, 43 A; 220/1.5, 4 F, 83, 85 B, 400; 229/40, 87 R; 108/55.1

[56] References Cited

U.S. PATENT DOCUMENTS

| 3,371,815 | 3/1968 | Macomber | 217/43 X |
| 3,401,814 | 9/1968 | Chiswell et al. | 220/4 F |
| 3,906,129 | 9/1975 | Damois | 220/400 X |
| 4,013,168 | 3/1977 | Bamburg et al. | 217/43 A X |
| 4,230,227 | 10/1980 | Kowall et al. | 217/43 A X |
| 4,470,227 | 9/1984 | Bigelow et al. | 108/56.1 X |

Primary Examiner—Steven M. Pollard
Attorney, Agent, or Firm—Kolisch, Hartwell & Dickinson

[57] ABSTRACT

A novel reusable, rollable wrap for securing items stacked on a rectangular pallet. The wrap includes a flexible sheet, having ends which are secured together by detachable means, such as a zipper, and a plurality of parallel, stiff, elongate corner support members which are secured to the sheet at spaced-apart intervals therealong between the ends of the sheet. One set of ends of the members surroundingly engages the corners of the pallet with the members thereby defining the shape of the wrap above the pallet. The apparatus further includes releasable fastener means mounted on the sheet for securing the sheet to itself when the wrap is in a rolled condition for storage.

9 Claims, 2 Drawing Sheets

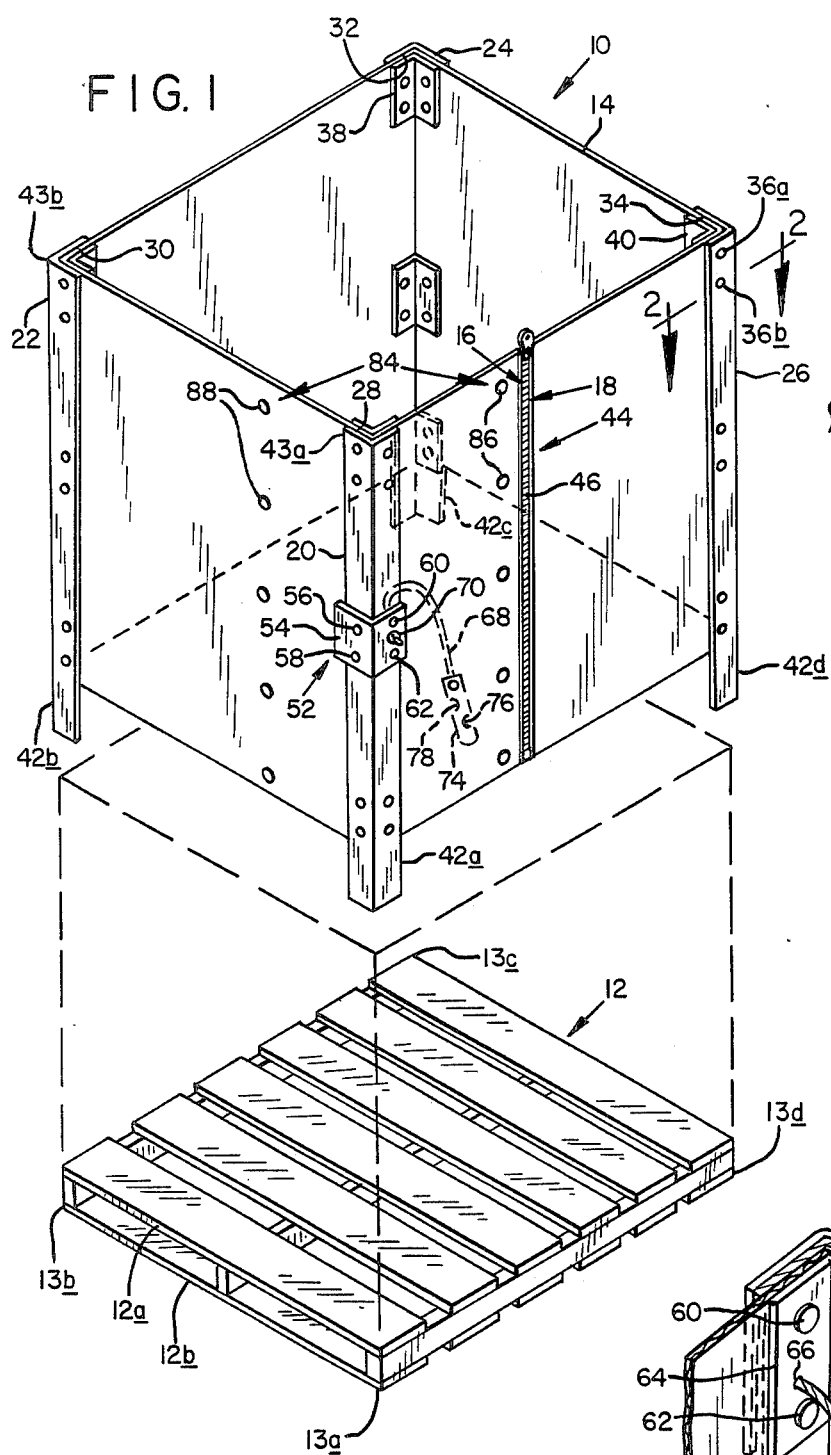
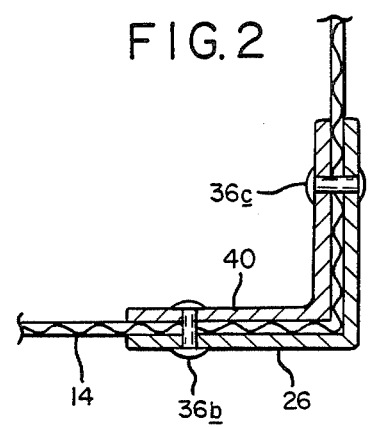
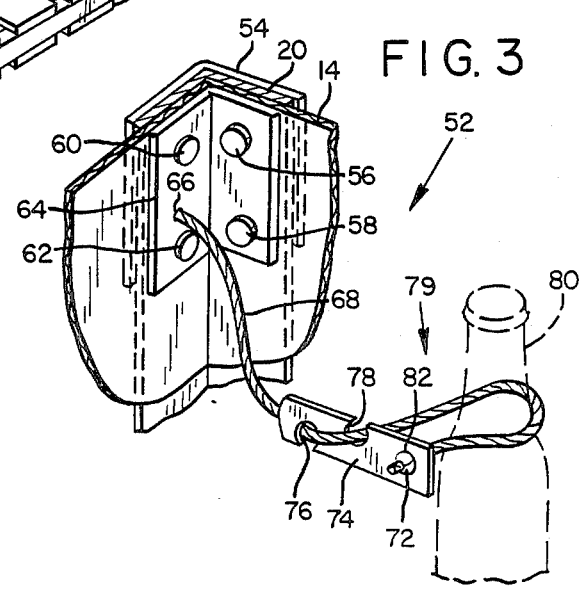

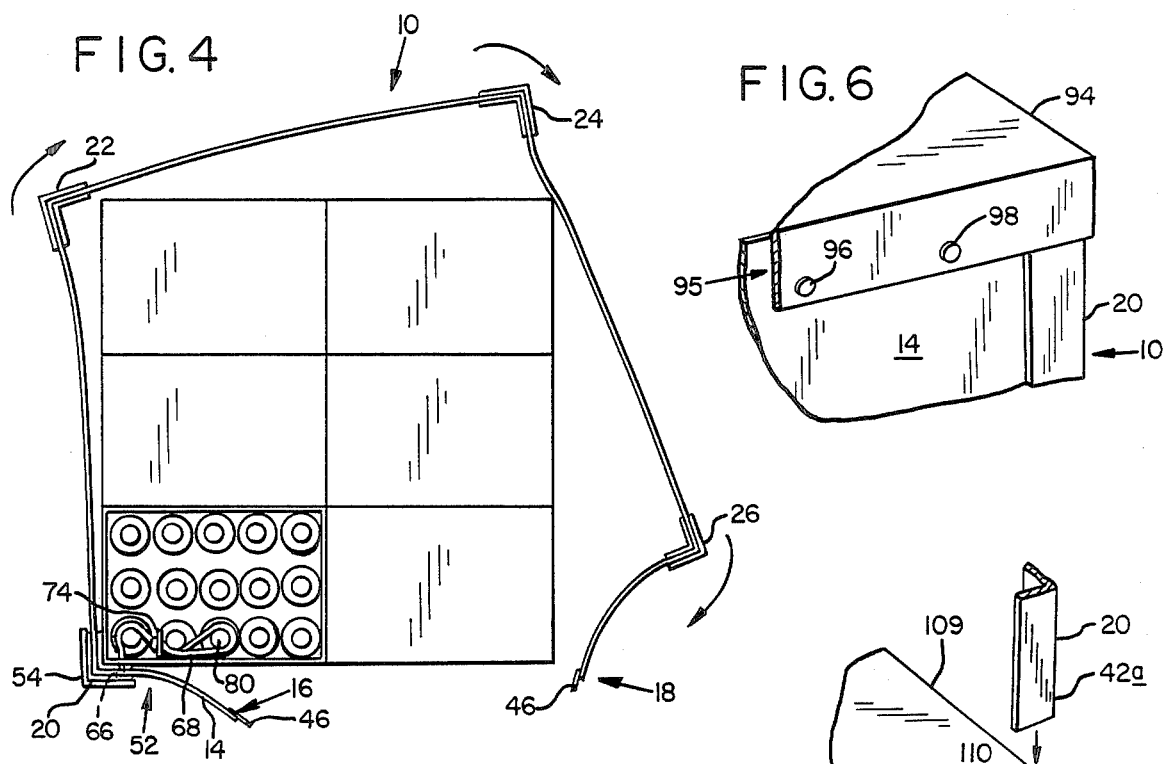
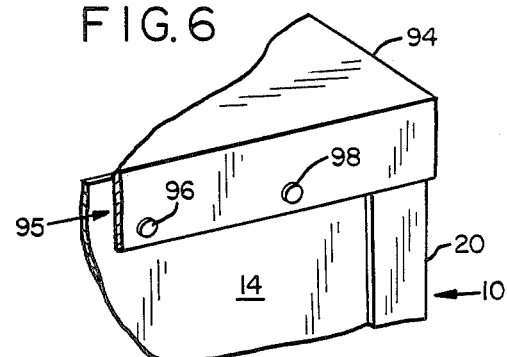
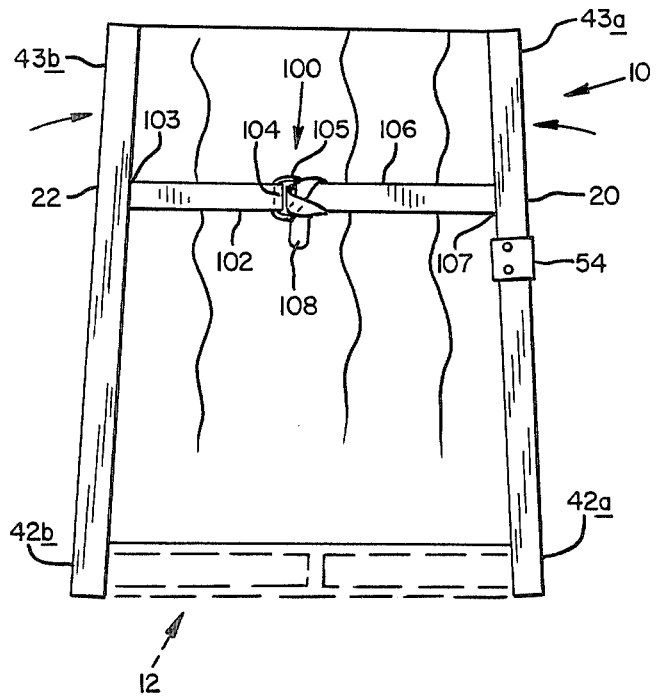
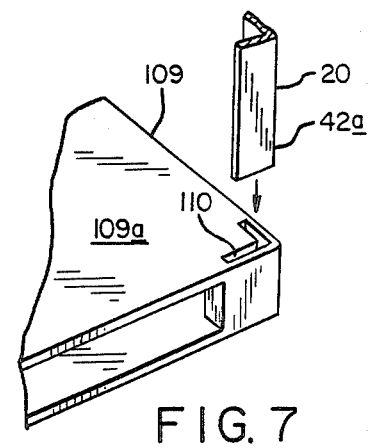
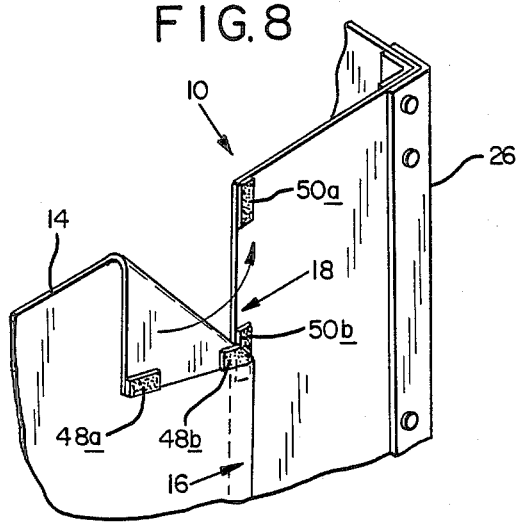

PALLET WRAP

BACKGROUND AND SUMMARY OF THE INVENTION

The present invention relates to a pallet wrap and, more particularly, to a novel reusable, rollable wrap for securing items stacked on a pallet.

Conventionally, soft drink bottlers stack bottles and cans containing soft drinks on wooden pallets in preparation for transportation to grocery stores and other vendors. The bottles and cans are generally secured to the pallet on which they are stacked by means of a self-adhering plastic shrink wrap material which comes in a roll. A worker typically walks around the pallet unrolling the plastic wrap by hand and winding it around a stack of items on the pallet numerous turns in order to secure the items onto the pallet for transportation. It takes approximately forty-five seconds to complete this process. The pallet with the bottles and cans so wrapped may then be transported by a forklift or electric pallet jack for loading or unloading on a truck. Because the wrapped portion is not integral with or connected to the pallet base, it is generally necessary for the worker to run a strap midway around these plastic wrapped pallets from the sides of the truck bed. This, of course, increases loading time.

Once the pallet is transported to its ultimate destination, the plastic wrap is removed by cutting it with a razor thereby rendering it unusable for further use. It is impractical to attempt to unwrap the plastic wrap instead of cutting it, because during the wrapping process the plastic material adheres to itself and often becomes twisted or partially torn.

The obvious disadvantage with this conventional method of securing items on a pallet is that the wrap is not reusable. A typical bottling operation in a large city may expend over $50,000.00 per year on plastic pallet wrap. Thus, use of plastic pallet wrap is not only very costly, but also results in substantial environmental waste.

Accordingly, it is a general object of the present invention to provide a novel wrap for securing items stacked on a pallet which is reusable thereby reducing costs and eliminating environmental waste associated with the conventional plastic shrink wrap.

Another object of the present invention is to provide a wrap for securing items stacked on a pallet which is sturdy in construction, but yet simple in design and inexpensive to manufacture.

A further object of the invention is to provide a pallet wrap which is easily and compactly stored.

Yet another object of the invention is to reduce the amount of time that it takes to install the wrap about the pallet.

A further object of the invention is to reduce the amount of time it takes to load the pallets onto the trucks for transportation.

A preferred embodiment of the proposed apparatus of the invention includes a rectangular pallet having an upper, horizontal load supporting surface spaced apart from a lower, horizontal ground-contacting surface. Extending about the perimeter of the pallet is a flexible sheet having ends which are secured together by detachable means, such as a zipper. A plurality of parallel, stiff, elongate corner support members are secured to the flexible sheet at spaced-apart intervals therealong between the ends of the sheet. One set of ends of the support members surroundingly engages the corners of the pallets, with the members thereby defining the shape of the wrap above the pallet. The apparatus further includes releasable fastener means having one part mounted on the sheet adjacent one end of the sheet and a second mating part mounted on the sheet spaced along the length of the sheet from the first part. The fastener means secures the sheet to itself when the wrap is in a rolled condition for storage.

In operation, the pallet is first stacked with items, such as bottles and/or cans. When the items are stacked on the pallet and ready for transportation, the fastener means on the wrap is then released and the wrap is unrolled from its stored condition. While unrolling, the worker walks around the perimeter of the pallet, establishing a corner support member at each corner of the pallet. Once all four corner support members are properly positioned, the ends of the flexible sheet are then secured to each other by the detachable means. The pallet is then ready to be transported by the forklift or electric pallet jack for loading on the truck. The items are thereby efficiently secured to the pallet due to the fact that the wrap completely encloses the items about the pallet.

With the construction described, it can be seen that the wrap may be quickly and easily installed about the pallet.

It can also be appreciated from the construction described that the unloading operation can easily and rapidly be effected merely by releasing the detachable means, rolling the flexible sheeting about the support members and securing the sheeting to itself by activating the fastener means. Furthermore, because the sheet is flexible, it is possible to obtain a tight roll.

These and other objects and advantages of the present invention will become more clearly understood from a consideration of drawings and the following detailed description of a preferred embodiment.

BRIEF DESCRIPTION OF THE DRAWINGS

FIG. 1 is a side-perspective view of a pallet wrap according to the present invention, illustrating a condition wherein the wrap is installed about the pallet.

FIG. 2 is a partial cross-sectional view taken generally along line 2—2 in FIG. 1.

FIG. 3 is a fragmentary, partially broken-away perspective view of the embodiment of FIG. 1 taken from the inside of the wrap and illustrating means for connecting the wrap to an item stacked on the pallet.

FIG. 4 is a plan view of the pallet wrap shown in FIG. 1, illustrating a relative condition wherein the wrap is positioned just prior to attachment of the detachable means.

FIG. 5 is a side view of a modification of the pallet wrap which includes slack-pulling means for drawing together an opposite set of ends of said corner support members.

FIG. 6 is a partial view of a removable covering which covers the upper portion of the wrap.

FIG. 7 is a partial view of another modification of the invention which includes a specially designed base having wells for receiving a set of ends of the corner support members.

FIG. 8 is a partial view of the pallet wrap wherein the detachable means comprises disengageable, interlocking pads.

DETAILED DESCRIPTION OF A PREFERRED EMBODIMENT OF THE INVENTION

Referring now to the drawings and, more particularly to FIG. 1, there is shown generally at 10 a wrap for securing items stacked on a rectangular wooden pallet, shown generally at 12, which has an upper, horizontal load supporting surface 12a spaced apart from a lower, horizontal ground-contacting surface 12b.

Wrap 10 includes an elongate, rectangular flexible sheet 14 having ends, shown generally at 16 and 18. Wrap 10 is typically constructed of a heavy fabric, such as canvas. Wrap 10 may also be constructed of a heavy vinyl, preferably of the type which resists tearing. In an operable condition with ends 16, 18 secured together, sheet 14 extends about the perimeter of pallet 12.

A plurality of parallel, stiff elongate corner support members 20, 22, 24, 26 are secured to flexible sheet 14 at spaced-apart intervals therealong and between ends 16; 18 of sheet 14. The members extend transversely of the sheet. Corner support members 20, 22, 24, 26 are typically constructed of aluminum angle iron with each member having a recessed side 28, 30, 32, 34, respectively.

Corner members 20, 22, 24, 26 have one set of ends 42a, 42b, 42c, 42d, respectively, wherein the recessed side thereof embraces and surroundingly engages respective corners 13a, 13b, 13c, 13d of pallet of 12. By virtue of this construction, members 20, 22, 24, 26 define the shape of the wrap above the pallet, and have a seated position about the pallet.

In one particular embodiment of the invention, each corner support member is approximately sixty-four inches long and one and one-half inches by one and one-half inches wide, and approximately one-eighth inch thick.

As best seen in FIGS. 1 and 2, sheet 14 extends about the inside of the recessed sides of the support members. Members 20, 22, 24, 26 are secured to sheet 14 by means of rivets, such as those illustrated at 36a, 36b, 36c on member 26. Washers, such as those shown at 38 and 40, are provided to prevent tearing of sheet 14 by the rivets. By providing the corner support members on the outside of sheet 14, the sheet is protected from increased wear at the corner stress points.

Wrap 10 further comprises a detachable means or cooperating means, shown generally at 44, which secures ends 16, 18 of sheet 14 to each other. In the embodiment illustrated in FIG. 1, detachable means 44 comprises a conventional heavy-duty zipper 46. In some operations, such as where there varied size loads, a dual separating zipper may be preferred.

Alternatively, as illustrated in FIG. 8, detachable means 44 may comprise coacting disengageable interlockable pads 48a, 48b and 50a, 50b mounted adjacent ends 16, 18 respectively, of sheet 14 and on opposite sides thereof. Pads 48a, 48b and 50a, 50b comprise a cooperating hook and loop inter-engaging system, as exemplified by the well-known trademarked product known as Velcro.

As best shown in FIGS. 1, 3 and 4, wrap 10 further includes means shown generally at 52, for connecting the wrap to an item stacked on the pallet. Means 52 includes bracket 54 which is mounted on corner member 20 intermediate its ends 42a and 43a. Fasteners 56, 58, 60, 62 mount bracket 54 on member 20, and join together bracket 54, corner member 20, sheet 14 and a washer 64. A bore 66 extends through bracket 54, corner member 20, sheet 14 and washer 64.

Means 52 further includes a tie 68, having ends 70, 72, which is inserted through bore 66, and a clip 74 which has a first U-shaped notch 76 adjacent one of its ends, an aperture 82 adjacent its opposite end, and a second U-shaped notch 78 disposed intermediate first notch 76 and aperture 82. One end 70 of tie 68 is anchored to bracket 54 by making a knot in tie 68 adjacent end 70. The other end 72 of tie 68 is anchored to clip 74 by inserting end 72 through aperture 82 and making a knot in tie 68 adjacent end 72.

When means 52 is in an operable condition, a stretch, shown generally at 79, of tie 68, is looped around an item, such as a bottle 80, which is stacked midway up on pallet 12. Stretch 79 is then inserted through second U-shaped notch 78 and then through first U-shaped notch 76 in clip 74.

Wrap 10 further includes a releasable fastener means, shown generally at 84 (see FIG. 1), which has one set of parts 86 mounted on sheet 14 adjacent end 16, and a second, mating set of parts 88 mounted on sheet 14 spaced along the length of the sheet from the first set of parts 86. Fastener means 84 secures sheet 14 to itself when wrap 10 is in a rolled condition for storage. Each part 86 of fastener means 84 may comprise a snap ball mounted on sheet 14 adjacent end 16. Each mating part 88 may comprise a cooperating snap socket. In a rolled condition for storage, wrap 10 is held from unrolling by snapping the balls into their corresponding snap sockets.

FIG. 6 illustrates a wrap 10 which is provided with a removable covering 94 having a top expanse and depending border flanges. Covering 94 is constructed of the same type of material as sheet 14, i.e heavy fabric or canvas, or heavy vinyl having anti-rip characteristics. Covering 94 extends over and completely surrounds the top portion, shown generally at 95, of wrap 10 and is secured to sheet 14 by detachable, mating fasteners, such as those illustrated at 96 and 98. Use of a covering is particularly advantageous when the stacked and wrapped pallets are transported on open-bed trucks because the covering provides protection from the elements.

FIG. 5 illustrates a wrap having a slack-pulling means shown generally at 100, which is used to draw together an opposite set of ends 43a and 43b of corner support members 20, 22, respectively. Slack-pulling means 100 includes a first strap 102 having one end 103 mounted on corner member 22 and another end 104 secured to a D-bar 105, and a second strap 106 having one end 107 mounted on member 20. A similar slack-pulling means may be provided between other pairs of corner support members. In an operable condition for pulling slack, the other end 108 of second strap 106 is looped through D-bar 105, thereby providing tension and pulling together ends 43a and 43b of members 20, 22. Slack-puller 100 is particularly adapted for use in situations where the pallet is not fully loaded with items and when the loads are uneven.

FIG. 7 illustrates a modification of my invention which includes a specially designed horizontal base 109, having a support surface 109a and a plurality of wells or sockets, such as well or socket 110, carried by and distributed about the perimeter of base 109. Base 109 may be constructed of wood or metal. Support members 20, 22, 24, 26 are secured to sheet 14 at spaced-apart intervals between ends 16, 18 of the sheet, which intervals correspond to and are opposed from each of the wells or sockets in base 109. Ends 42a, 42b, 42c, 42d of members 20, 22, 24, 26, respectively, engage a corresponding well in base 109 thereby defining the perimeter of the wrap.

As illustrated in FIG. 4, in a loading operation, pallet 12 is first stacked with items, such as bottles or cans. When the items are stacked on the pallet and ready for being transported, wrap 10 is unrolled from its stored condition by releasing fastener means 84. The worker then unrolls wrap 10 to the point where he or she contacts corner member 20. At this point, the worker engages end 42a against corner 13a of pallet 12, and, while supporting corner member 20, the worker grasps tie 68 and wraps it around an item, such as bottle 80, which is stacked midway up on pallet 12. Stretch 79 of tie 68 is then inserted through second U-shaped notch 78 in clip 74 and then through first U-shaped notch 76 in clip 74.

Once means 52 has connected corner member 20 to an item on the pallet, the worker can continue to unroll wrap 10, walking around the perimeter of the pallet and engaging corner members 22, 24, 26 with their respective corners on pallet 12. After this is accomplished, the worker can then secure ends 16, 18 of sheet 14 by engaging detachable means 44 by either zipping zipper member 46, as illustrated in the embodiment shown in FIG. 1, or by overlapping disengageable interlocking pads, 48a, 48b with pads 50a, 50b, as shown in the embodiment illustrated in FIG. 8. So installed, the items are secured to the pallet by wrap 10 and the pallet is then ready to be transported to the truck for loading.

As can be appreciated from the construction described, the unloading operation can be accomplished quickly and easily merely by releasing detachable means 44, rolling the flexible sheeting about the support members into a tight roll, and securing the sheeting to itself by activating the fastener means.

From the above disclosure, it can be appreciated that wrap 10 provides an economical and environmentally conservative method of effectively securing items stacked on a pallet. Furthermore, because of its unique construction, the wrap may be securely and compactly stored.

Reduction in loading and unloading time is yet another advantage of the present invention over the prior art. The wrap can be both quickly and easily installed and disassembled. Also, because the wrap surroundingly engages the pallet, the items stacked on the pallet are more securely supported on the pallet, thereby eliminating the need for the person loading the transportation vehicle to strap the wrapped pallet to the sides of the vehicle.

While a particular embodiment of the invention has been described, it should be obvious that variations and modifications are possible without departing from the spirit of the invention.

It is claimed and desired to secure by Letters Patent:

1. In combination with a pallet, a wrap for securing items stacked on the pallet comprising:
    a flexible sheet separate from the pallet extending about the perimeter of the pallet having ends secured together, and
    stiff, elongate corner support members attached to said flexible sheet at spaced-apart intervals therealong, a set of ends of said members surroundingly engaging the corners of the pallet and said members defining the shape of the wrap above the pallet and the position of these said set of ends of said members being dictated by the location of the corners of the pallet.

2. In combination with a rectangular pallet, a wrap for securing items stacked on the pallet comprising:
    a flexible sheet separate from the pallet having ends, said sheet extending about the perimeter of the pallet, and
    a plurality of parallel stiff, elongate corner support members secured to said flexible sheet at spaced-apart intervals therealong and between the ends of said sheet, one set of ends of said members surroundingly engaging the corners of the pallet and said members defining the shape of the wrap, and the position of these said set of ends of said members being dictated by the location of the corners of the pallet, and
    detachable means securing the ends of said sheet to each other.

3. The combination of claim 2, which further includes releasable fastener means having one part mounted on the sheet adjacent one end of said sheet and a second mating part mounted on the sheet spaced along the length of the sheet from the first part, said fastener means securing the sheet to itself when the wrap is in a rolled condition for storage.

4. The combination of claim 2, which further includes means connecting the wrap to an item stacked on the pallet.

5. The combination of claim 2, which further includes a removable covering which covers the upper portion of the wrap and is detachably connected to the wrap.

6. The combination of claim 2, wherein said detachable means comprises a zipper.

7. The combination of claim 2, wherein said detachable means comprises disengageable interlocking pads mounted adjacent the ends of said sheet and on opposite sides thereof.

8. The combination of claim 2, which further includes slack-pulling means for drawing together an opposite set of ends of said corner support members.

9. The combination of:
    a horizontal base including a support surface and a plurality of spaced-apart sockets carried by and distributed about the perimeter of the base;
    a wrap adapted to extend about the perimeter of the base;
    said wrap comprising an elongate flexible sheet separate from the base having ends, and stiff, elongate support members extending transversely of the sheet which are secured to the sheet at spaced-apart intervals along the length of the sheet;
    a set of ends of said support members being insertable within said sockets carried by said base and said sheet with the ends of the support members so inserted, extending in a course which substantially follows the perimeter of the base with the position of said set of ends of said members being dictated by the location of said sockets; and
    said wrap further including detachable means for securing the ends of said sheet to each other.

* * * * *